(No Model.)
J. HOLUM.
CAR COUPLING.
No. 564,376. Patented July 21, 1896.
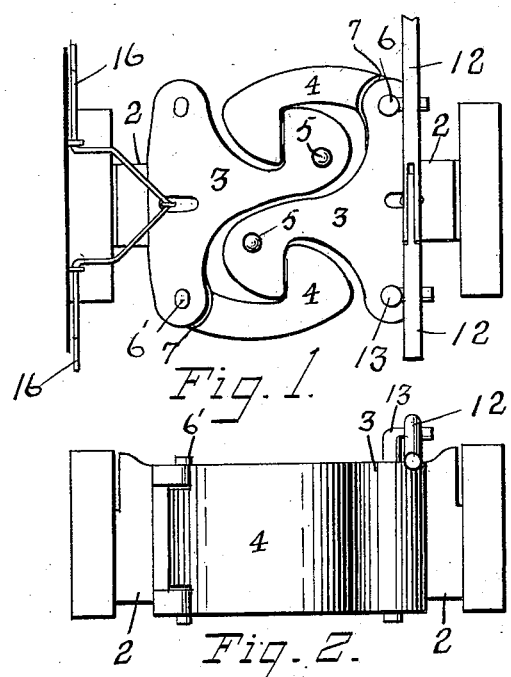
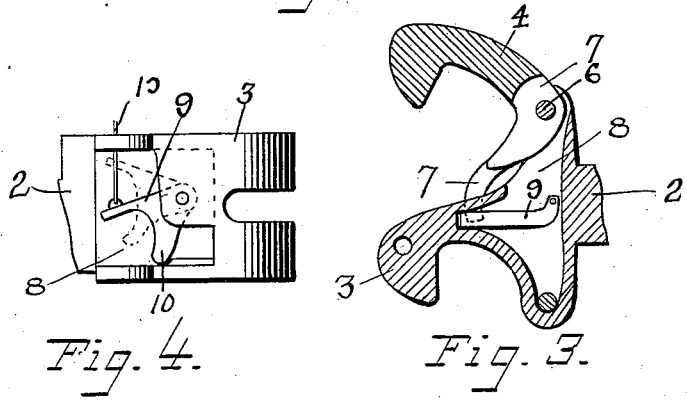
Witnesses
B. P. Shepherd
Richard Paul
Inventor
John Holum
By Paul & Hawley
his attorneys

UNITED STATES PATENT OFFICE.

JOHN HOLUM, OF MINNEAPOLIS, MINNESOTA.

CAR-COUPLING.

SPECIFICATION forming part of Letters Patent No. 564,376, dated July 21, 1896.

Application filed January 6, 1896. Serial No. 574,524. (No model.)

*To all whom it may concern:*

Be it known that I, JOHN HOLUM, a citizen of the United States, residing at Minneapolis, county of Hennepin, State of Minnesota, have invented certain new and useful Improvements in Car-Couplers, of which the following is a specification.

My invention relates to automatic car-couplers for use on freight-cars, and the object I have in view is to provide a simple and inexpensive coupler, and at the same time one that will be strong and durable.

A further object is to provide a coupler that will be reliable in its operation, which can be uncoupled without passing between the cars, and which can be used with the ordinary link and pin, if desired.

My invention consists generally in providing each draw-bar with a head having a fixed and a pivoted jaw to interlock with similar jaws provided on the draw-bar of the adjoining car, in combination with a locking mechanism adapted to automatically lock the jaws together and to hold them securely until disengaged when it is desired to uncouple the cars, all as hereinafter described, and particularly pointed out in the claims.

In the accompanying drawings, forming part of this specification, Figure 1 is a plan view of a coupler embodying my invention. Fig. 2 is a side elevation of the same. Fig. 3 is a plan view of the draw-head with the top removed, showing the interior locking mechanism. Fig. 4 is a side view of the locking mechanism.

In the drawings, 2 represents the draw-bars, each being provided with the fixed jaws 3 and the pivoted jaws 4, the jaws on one head being adapted to interlock with those on the draw-bar of the adjacent car. Each fixed jaw is provided with a slotted end to receive the end of any ordinary link-coupling, and pins 5 are provided in vertical openings in the fixed jaws to hold the links in position when in use.

Both the fixed and pivoted jaws are hook-shaped, and the pivoted jaws are held in position by pins 6 and 6', which extend down through openings provided in one side of the head and in the end of the jaws. The pivoted jaws are also provided with an arm 7, which extends into a recess 8, provided in the heads in the rear of the fixed jaws, as shown in Fig. 3. Within this recess is pivoted a hook or catch 9, having a projecting arm 10 to engage the arm 7 on the pivoted jaw.

Upon one draw-bar I provide the levers 12, one of which is pivotally supported by the pin 6, and the other by a pin 13, arranged in the opposite side of the draw-head, as shown in Fig. 1. These levers are pivotally connected at the middle of the draw-head over an opening therein, and are connected by a cord 15 with the catch 9, so that when the outer end of the levers is depressed the catch will be raised and disengaged from the arm on the pivoted jaw. On the other draw-bar I provide a lever 16, pivoted to the end of the car-body, and having a laterally-projecting middle portion, which extends out over the draw-head and is connected to the catch arranged within the draw-head in the same manner as the levers 12 heretofore described.

The levers 12 and 16 project out upon each side of the car, so that they may be operated from either side of the train.

As a fixed and movable jaw is provided on each draw-bar, it is obvious that the cars may be coupled even though one of the jaws is broken and unfit for use, and should it be necessary to couple a car provided with my coupler to one not so provided it may be done by means of a link and the pins provided in the slotted ends of the fixed jaws.

The operation of the device is as follows: To uncouple the cars, the levers are operated to raise the catches 9, and allow the movable jaws to swing outwardly to permit the fixed jaws to be disengaged therefrom when the train is started. The pivoted jaws are left in this position, and when it is desired to again couple the cars the fixed jaw on one head will be forced in between the fixed and movable jaw of the other, and striking the curved inner surface of the pivoted jaw will force the arm 7 back within the recess, raising the catch 9 and permitting it to fall in front of the arm 7, thereby locking the pivoted jaw until it is again raised by the movement of the levers heretofore described.

Having thus described my invention, I claim as new and desire to secure by Letters Patent—

1. In a device of the class described, the combination, with the draw-bars 2, provided with the heads having recesses, of the fixed jaws 3 provided on said heads and having oppositely-turned hooked ends, the pivoted jaws 4 also having hooked ends to engage the ends of said fixed jaws, said movable jaws being provided with the lugs or arms 7 to enter the recesses provided in said heads, the pivoted dogs 9 arranged within said recesses to engage said lugs or arms and lock the same, and the pivoted levers arranged upon said drawheads and connected with said dogs or catches, for the purpose set forth.

2. In a device of the class described, the combination with the draw-bars provided with heads having recesses, of the fixed jaws provided on said heads, and having oppositely-turned hooked ends, the pivoted jaws having hooked ends to engage said fixed jaws, said pivoted jaws being provided with lugs or projections to enter the recesses provided in said heads, the pivoted dogs arranged within said recesses to engage said lugs or arms and lock the same, and means for raising said dogs to permit the disengagement of said fixed and pivoted jaws, substantially as described.

In testimony whereof I have hereunto set my hand this 19th day of December, A. D. 1895.

JOHN HOLUM.

In presence of—
C. G. HAWLEY,
RICHARD PAUL.